United States Patent
Schmitt

(10) Patent No.: US 6,618,891 B2
(45) Date of Patent: Sep. 16, 2003

(54) ROTARY DRUM RELEASE FOR A DRAIN CLEANING MACHINE

(75) Inventor: Randall Paul Schmitt, Clinton Township, MI (US)

(73) Assignee: Masco Corporation, Taylor, MI (US)

( * ) Notice: Subject to any disclaimer, the term of this patent is extended or adjusted under 35 U.S.C. 154(b) by 223 days.

(21) Appl. No.: 09/927,682

(22) Filed: Aug. 10, 2001

(65) Prior Publication Data

US 2003/0028983 A1 Feb. 13, 2003

(51) Int. Cl.[7] .................................................. B08B 9/02
(52) U.S. Cl. ............................. 15/104.33; 242/404.2; 403/327
(58) Field of Search ........................ 15/104.33, 104.03; 242/404.2, 404.3, 406, 597, 597.5, 597.8; 403/326, 327, 321, 322.3, 324, 325

(56) References Cited

U.S. PATENT DOCUMENTS

| | | | |
|---|---|---|---|
| 4,716,613 A | * | 1/1988 | Irwin ..................... 15/104.33 |
| 4,914,775 A | * | 4/1990 | Kirk ....................... 15/104.33 |
| 5,031,276 A | | 7/1991 | Babb et al. |
| 5,265,301 A | * | 11/1993 | Irwin ..................... 15/104.33 |
| 5,507,062 A | | 4/1996 | Salecker |
| 5,618,123 A | | 4/1997 | Pulse |
| 5,640,736 A | | 6/1997 | Salecker |
| 6,243,905 B1 | | 6/2001 | Rutkowski |

* cited by examiner

*Primary Examiner*—Robert J. Warden, Sr.
*Assistant Examiner*—Shay Balsis
(74) *Attorney, Agent, or Firm*—Carlson, Gaskey & Olds

(57) ABSTRACT

A rotary drum release assembly includes a multiple of lock pins which engage a rotary drum shaft to lock and unlock a rotary drum to a drain cleaning machine without the need for tools. The rotary drum release assembly is mounted within a support frame assembly. A rotary drum shaft groove is located within a sleeve mounted to the support frame assembly to minimize localized weakening of the shaft. Rotation of an actuating handle engages cam surfaces with the lock pins to overcome their spring bias of the lock pins and simultaneously drive the lock pins away from the shaft to allow release of the drum. To mount the drum, the drum shaft is pushed into the sleeve and the lock pins are received into the shaft groove.

18 Claims, 5 Drawing Sheets

ROTARY DRUM RELEASE FOR A DRAIN CLEANING MACHINE

BACKGROUND OF THE INVENTION

The present invention relates to a drain cleaning machine, and more particularly to a release assembly for removing the rotatable drum from the machine without tools.

Conventional drum type drain cleaning machines typically include a frame structure supporting a rotatable snake drum and a drive motor arrangement for rotating the drum. The frame structure also supports a snake feeding arrangement by which the snake or cable is axially displaced relative to the rotating drum during use of the machine. The snake coiled within the rotatable drum is displaced by the feeding arrangement and inserted into a pipe or drain to be cleaned. Rotation of the drum rotates the snake to achieve such cleaning.

The rotatable drum in known drain cleaning machines may typically be removed from the support frame and drive arrangement to facilitate replacement of the drum with one containing a snake having a different diameter and to make the separate components more mobile. Disadvantageously, conventional removable drums require tools to disassemble the rotatable drum from the support frame. This, of course, requires access to the proper tools and is also somewhat time consuming for the operator. Other known disassembly arrangements require a groove cut in a shaft which mounts the rotatable drum. The groove is located between the rotatable drum and the support frame to receive a spring loaded pin which rides within the groove. The groove is retracted to disassemble the rotatable drum from the support frame. By its location, the groove reduces the strength of the shaft in a weight bearing segment. Friction between the groove and the single pin may also eventually require the repair or replacement of the disassembly arrangement. Further, the pin must be manually retracted to both install and remove the rotatable drum.

Accordingly, it is desirable to provide a rotatable drum release assembly which provides an effective release without the necessity of tools and which locates shaft grooves in a position to minimize their load bearing effect on the shaft. It is further desirable to provide a rotatable drum release assembly that need not be manually actuated to assemble the rotatable drum to the support frame.

SUMMARY OF THE INVENTION

The rotary drum release assembly according to the present invention provides a multiple of lock pins which engage a drum shaft to lock and unlock a rotary drum to a drain cleaning machine. The rotary drum release assembly is mounted within a support frame assembly. The drum shaft extends from a sleeve in a cantilevered manner and the shaft groove is located within the sleeve to minimize localized weakening of the shaft.

The rotary drum release assembly includes a fixed cylindrical member mounted to the support frame about the sleeve. A pair of apertures extend through a wall of the fixed cylindrical member and are aligned with a corresponding pair of square openings which pass through the sleeve. The openings are located substantially perpendicular to the rotational axis of the drum shaft. The lock pins are mounted through the square openings and biased toward a groove in the rotary drum shaft.

Rotation of an actuating handle engages cam surfaces with cam pins extending from each of the lock pins to overcome the bias of the lock pins and simultaneously drive the lock pins away from the shaft. Once the lock pins clear the groove the drum shaft may be pulled from the sleeve. The drum is thus released. Releasing the actuating handle allows the handle to fall to its locked position.

To mount the drum, the drum shaft is pushed into the sleeve. As the distal end of the shaft is substantially conical, the distal end pushes the lock pins out of the way as the shaft is pushed into the sleeve. Once the shaft groove is aligned with the lock pins, the lock pins are driven toward the shaft by the springs such that the distal ends of the square portion are received into the shaft groove. The drum shaft is thereby rotatably locked into the sleeve.

The present invention therefore provides a rotatable drum release assembly which provides an effective release without the necessity of tools and which locates shaft grooves in a position to minimize their load bearing effect on the shaft. The present invention further provides a rotatable drum release assembly that need not be manually actuated to assemble the rotatable drum to the support frame.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
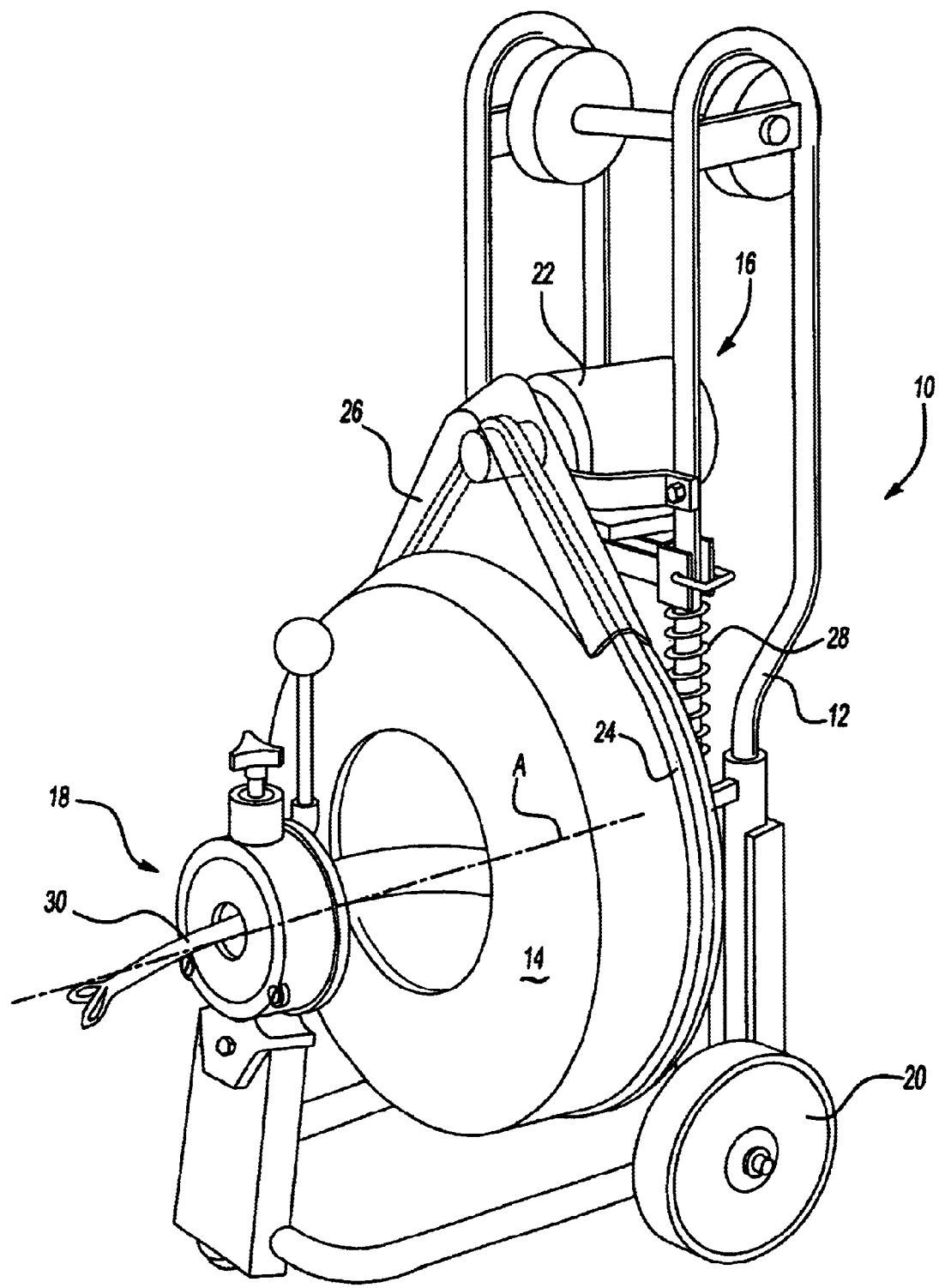
FIG. 1 is a general perspective view of a drain cleaning machine having a removable rotatable drum according to the present invention.

FIG. 1 illustrates a general perspective view of a portable drain cleaning machine 10 including a wheeled support frame assembly 12 which supports a rotatable snake drum 14, a drum drive assembly 16, and a snake feeding mechanism 18. Support frame assembly 12 is provided with at least one pair of wheels 20 such that the machine 10 is supported for rolling movement from one location to another.

The drum drive assembly 16 preferably includes an electric motor 22 which drives a drive belt 24. A removable cover 26 provides protection for the engagement between the belt 24 and motor 22. The motor 22 is mounted upon a biasing arrangement 28 which minimizes slack in the drive belt 24 and compensates for components which may be out of alignment while allowing removal of the belt 24.

The drum 14 contains a coiled flexible plumbers snake 30 which extends outwardly through the feed assembly 18. The feed assembly 18 displaces the snake 30 inwardly and outwardly relative to the drum 14 during operation of the machine 10. The drive belt 24 extends from the motor 22 and about the perimeter of the drum 14. It should be understood that although the belt is illustrated about the perimeter of the drum in the disclosed embodiment, other drive arrangements will also benefit from the present invention. Rotation of the drive belt 24 rotates the drum 14 about an axis of rotation A.

Figure 2:
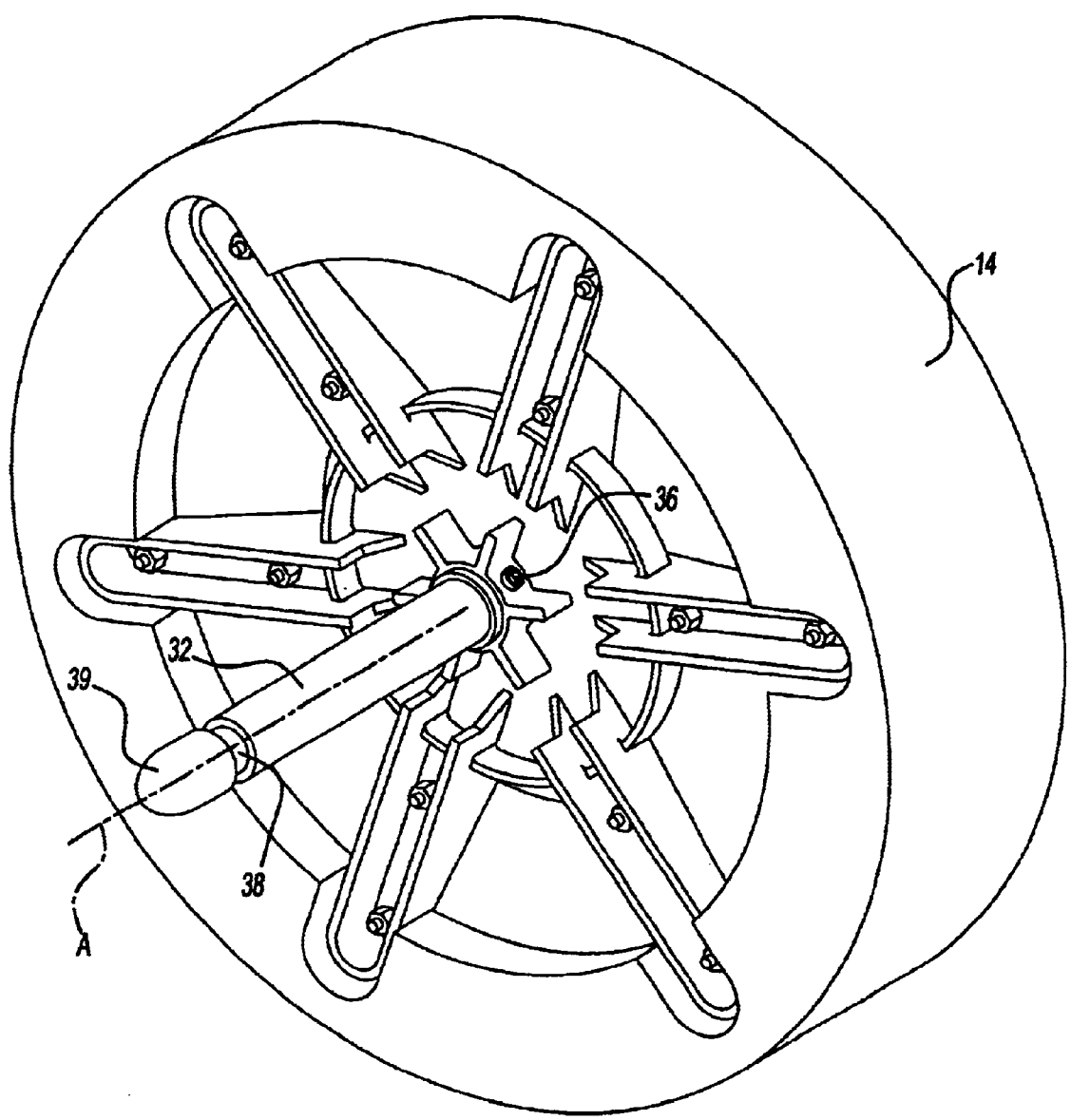
FIG. 2 is a rear perspective view of a removable rotatable drum.

Referring to FIG. 2, a rear view of the drum 14 illustrates a drum shaft 32 extending therefrom. The drum shaft 32 is mounted to the drum 14 by at least one fastener 36 such as a set screw of the like which engages a flat on the shaft 32 (not shown.) The drum shaft 32 defines the axis of rotation A. A shaft groove 38 extends about the perimeter of the shaft 32 adjacent a distal end 39 thereof. Preferably, the distal end 39 is substantially conical. It should be understood that other non-flat distal ends such as rounded, pointed, tapered and the like will also benefit from the present invention.

Figure 3:
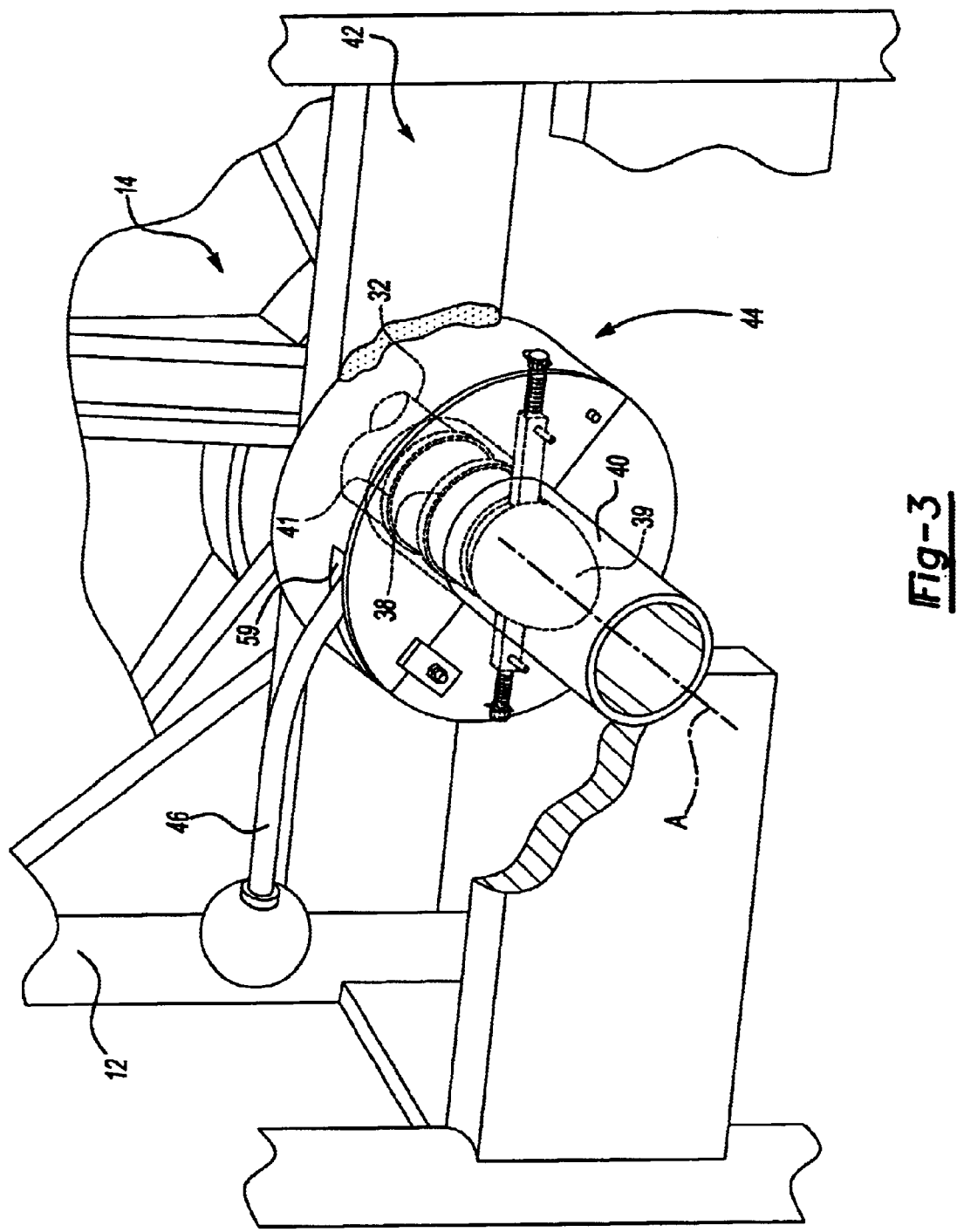
FIG. 3 is a rear perspective view of a rotary drum release assembly.

Referring to FIG. 3, the drum shaft 32 is rotatably and removably mounted in a sleeve 40 which is fixedly mounted to the support frame assembly 12 such that the shaft groove 38 is located therein. The sleeve 40 preferably includes one or more bushings or bearings 41 (FIG. 4) upon which the shaft 38 rotates. That is, the shaft 32 contacts the bearings and not the inner diameter of the sleeve 40. The sleeve 40 is preferably mounted through a cross brace assembly 42 along axis A. The cross brace assembly 42 preferably forms a substantially rigid box arrangement in cooperation with the frame assembly 12.

Figure 4:
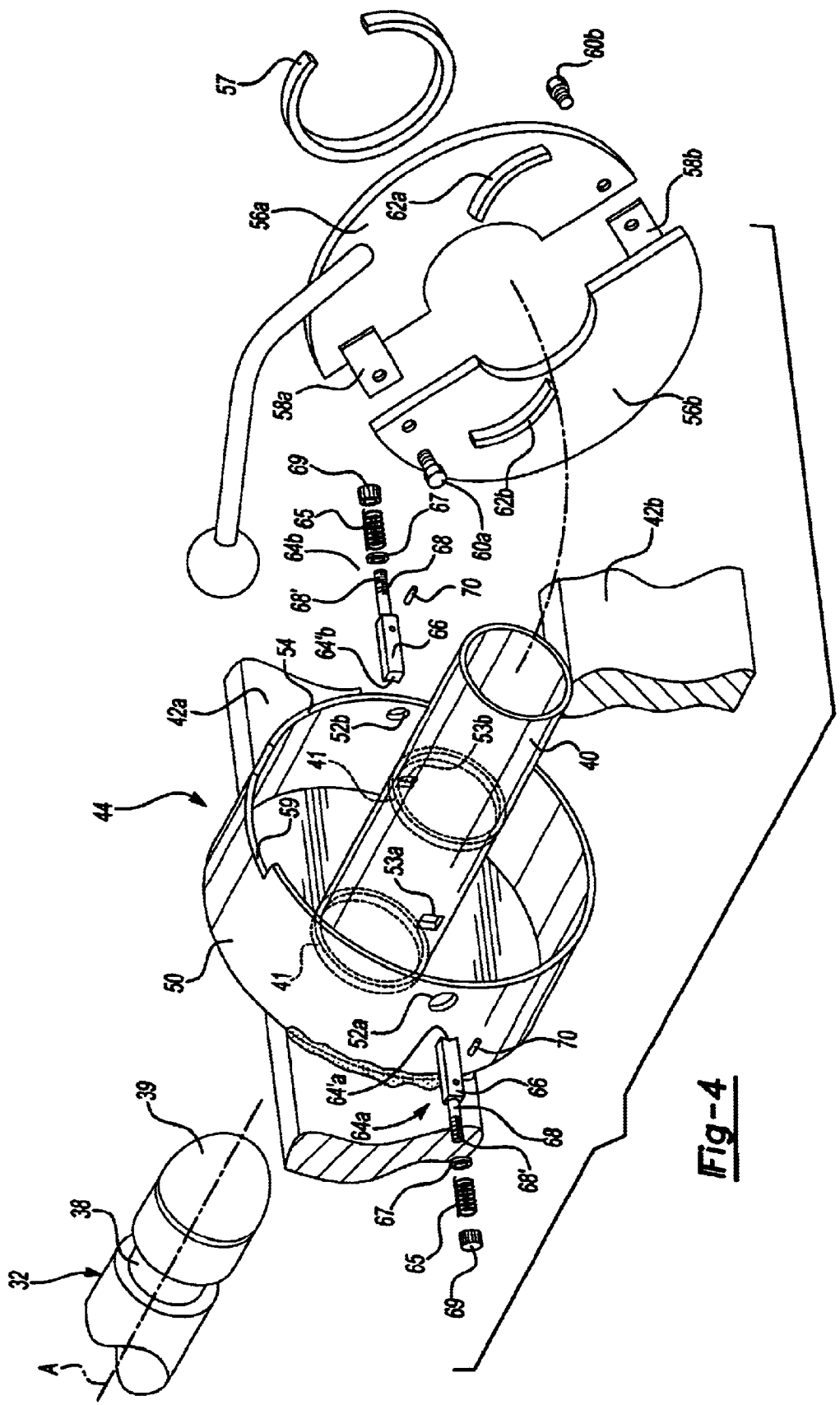
FIG. 4 is an exploded view of the rotary drum release assembly illustrated in FIG. 3.

A rotary drum release assembly 44 and actuating handle 46 are mounted within the cross brace assembly 42 (also illustrated in FIG. 4.) That is, the rotary drum release assembly 44 is substantially protected within the box-shaped area defined by the cross brace assembly 42 and support frame assembly 12. The drum shaft 32 extends from the sleeve 40 in a cantilevered manner and the shaft groove 38 is located within the box-shaped area defined by the cross brace assembly 42 and support frame assembly 12. By locating the shaft groove 38 within the box-shaped cross brace assembly 42, the impact of the localized weakening of the shaft 32 which may occur due to the shaft groove 38 is minimized.

As the drum is relatively heavy, the cantilevered shaft is stressed where it exits the sleeve. Prior designs located the groove in this area. The stress caused by the weight of the drum was directed into the groove. The inner diameter of the groove was the minimum shaft diameter necessary to support the drum. The shaft was heretofore relatively oversized which resulted in additional weight. The present invention locates the shaft groove 38 within the sleeve 40 and within the cross brace assembly 42. The area of the shaft 32 which extends from the sleeve 40 is groove-free and at the full shaft diameter. A smaller diameter and lighter shaft is thereby available without a loss of shaft strength.

Referring to FIG. 4, the rotary drum release assembly 44 includes a fixed cylindrical member 50 mounted to a first cross brace 42a. The fixed cylindrical member 50 is mounted coaxially with the sleeve 40. A pair of apertures 52a, 52b extend through a wall 54 of the fixed cylindrical member 50. The apertures 52a, 52b are aligned with a corresponding pair of square openings 53a, 53b which pass through the sleeve 40. The openings 52a, 52b, 53a, 53b are located substantially perpendicular to axis A to align with the shaft groove 38.

First and second lock plate halves 56a, 56b rotatably mount about the sleeve 40 between the fixed cylindrical member 50 and a second cross brace 42b. A mating tab 58a, 58b extends from each lock plate halve 56a, 56b. The first and second lock plate 56a, 56b are mounted about the sleeve 40 and a threaded fastener 60a, 60b is threaded through one lock plate 56a, 56b and into the mating tab 58a, 58b of the other lock plate halve 56a, 56b. A lock ring 57 or the like retains the assembled lock plates halves 56a, 56b to the sleeve 40.

A cam surface 62a, 62b extends from each the lock plate halve 56a, 56b toward the interior of the fixed cylindrical member 50. Preferably, the cam surfaces 62a, 62b extend in a helical manner relative to the axis A.

A lock pin 64 is mounted in line with each opening pair 52a, 53a, and 52b, 53b. By providing a multiple of lock pins 64, a redundant wear resistant lock is provided. Each lock pin 64 includes a collinear substantially square portion 66 and a substantially cylindrical portion 68 extending from the substantially square portion 68. The substantially cylindrical portion 68 receives a spring 65 which is trapped between an annular stop 67 and the fixed cylindrical member 50. Preferably, the annular stop 67 is a washer or the like which is received upon the cylindrical portion 68. Preferably, a standoff 69 is threadably received onto a threaded portion 68' of each cylindrical portion 68. One end of the spring 65 is retained by the standoff 69 and the other end of the spring 65 is received over the substantially cylindrical portion 68' to be retained by the annular stop 67 of the lock pins 64. Each lock pin 64 is biased by its spring 65 toward the shaft 32 (FIG. 5A; schematically illustrated by arrows L) such that a distal end 64a', 64b' of each lock pin 64a, 64b passes through the square apertures 53a, 53b to engage the shaft groove 42.

Figure 5A:
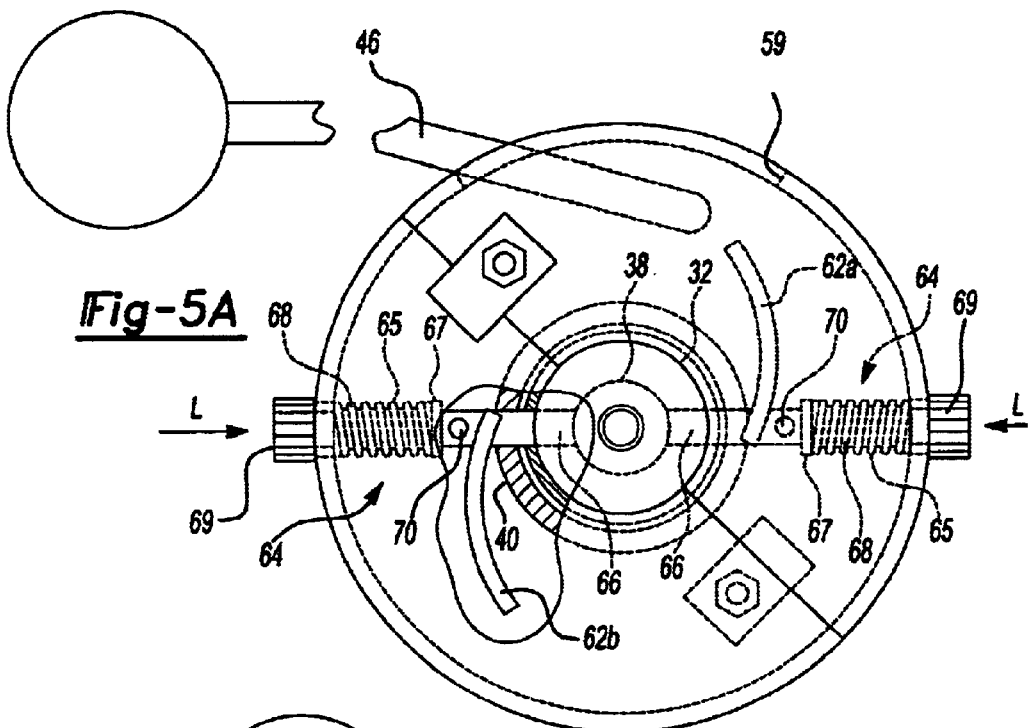
FIG. 5A is a rear partially phantom view of the rotary drum release assembly in a locked position.

By providing the substantially square portion 66, the lock pins 64 are prevented from rotating while being movable under bias of the spring 65 toward the shaft 38. The distal end 64' of each lock pin 64 is at least partially arcuate to correspond with the inner diameter of the shaft groove 38. By providing a substantially square distal end 64', a greater engagement surface area is provided between the lock pin 64 and the shaft groove 32 (FIG. 5A). A larger, more wear resistant engagement surface is thereby provided.

A cam pin 70 extends perpendicular to the axis of each lock pin 64. The cam pins 70 retain the spring biased lock pins 64 whether a shaft 32 is mounted within the sleeve 40 or not. That is, the lock pins 64 contact the shaft groove 38 (FIG. 5A) or the can surfaces 62. Moreover, the cam surfaces 62 engage the cam pins 70 to retract the lock pins 64 (FIG. 5B) as will be further described below.

The actuating handle 46 extends from one of the lock plate halve 56a, 56b. The actuating handle 46 extends through a slot 59 in the fixed cylindrical member 50 to limit rotation of the assembled lock plate halves 56a, 56b to approximately 45 degrees. Rotation of the actuating handle 46 rotates the assembled lock plate halves 56a, 56b relative to the fixed cylindrical member 50. The cam surfaces 62a, 62b are fixed to the lock plate halves 56a, 56b and thereby rotate relative to axis A. Preferably, the actuating handle 46 is arranged such that gravity maintains the lock plate halves 56a, 56b and associated cam surface 62a, 62b in a locked position (FIG. 5A). That is, the cam surfaces 62 are not engaged with the cam pins 70 as the lock pins 64 are engaged with the shaft groove 42.

Figure 5B:
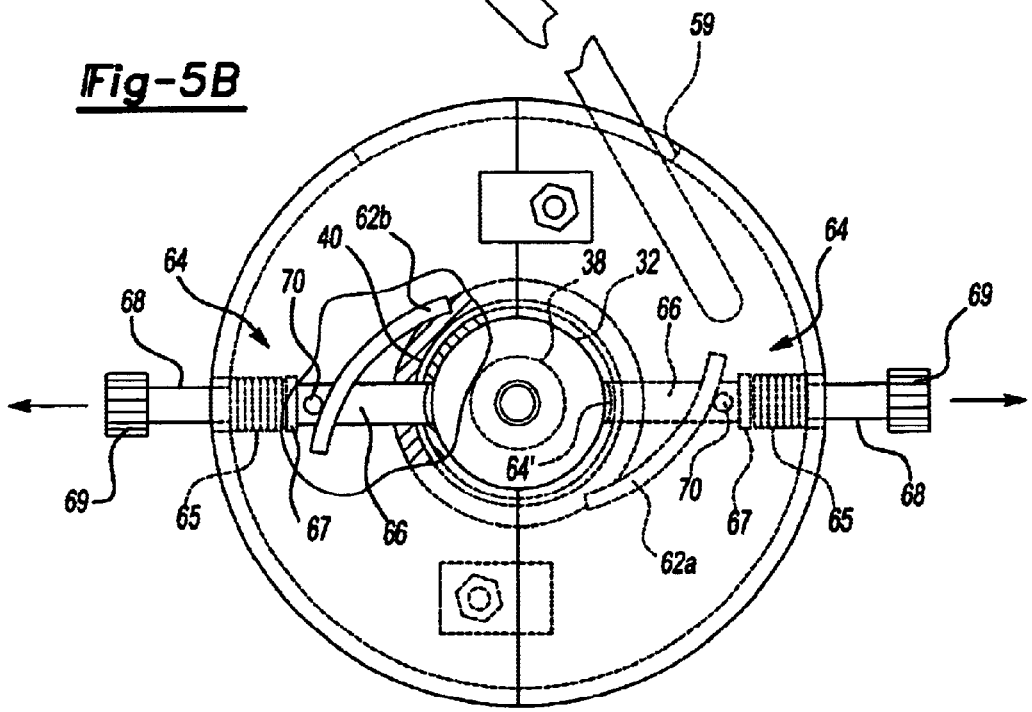
FIG. 5B is a rear partially phantom view of the rotary drum release assembly in an unlocked position.

Referring to FIG. 5B, rotation of the actuating handle 46 (illustrated schematically by arrow R,) the cam surface 62 engages the cam pins 70. Further rotation of the actuating handle 46 rotates the cam surfaces 62 which exert a force upon the cam pins 70. The cam surfaces 62 drive the cam pins 70 such that the lock pins 64 overcome their springs 65 and drive the lock pins 64 away from the shaft 32 and towards the fixed cylindrical member 50. Once the lock pins 64 clear the groove 38 the drum shaft 32 may be pulled from the sleeve 40. The drum 14 (FIG. 2) is thus released.

Releasing the actuating handle 46 allows the handle to fall to its locked position (FIG. 5A.) The cam surfaces 62 are returned to their unlocked position and provide a stop for the lock pins 64 when the cam pins 70 contact the cam surfaces 62.

To mount the drum, the drum shaft 38 is pushed into the sleeve 40. As the distal end 39 of the shaft 32 is substantially conical, the distal end 39 pushes the lock pins 64 out of the way as the shaft 32 is pushed into the sleeve 40. That is, the distal end 39 overcomes the bias of each spring 65 to force the lock pins 64 toward the inner diameter of the sleeve 40. Once the shaft groove 38 is aligned with the lock pins 64, the lock pins 64 are driven toward the shaft 32 by the springs 65 such that the distal end 64a', 64b' is received into the groove 38. The drum shaft 32 is thereby rotatably locked into the sleeve 40 (FIG. 5A.)

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. In a drain cleaning machine having a rotary drum, a drum release assembly comprising:
   a sleeve to rotatably receive a rotary drum shaft, said rotary drum shaft defining an axis of rotation;
   a lock pin movably mounted substantially perpendicular to said axis of rotation;
   a biasing member to bias said lock pin toward said axis of rotation; and
   a cam surface engageable with said lock pin, said cam surface rotatable about said axis of rotation to drive said lock pin against said biasing member.

2. The rotary drum release assembly as recited in claim 1, further including a fixed cylindrical member coaxially mounted about said sleeve.

3. The rotary drum release assembly as recited in claim 2, further including a lock plate mounting said cam surface, said lock plate rotatable about said axis of rotation relative to said fixed cylindrical member.

4. The rotary drum release assembly as recited in claim 3, further including an actuating handle attached to said lock plate.

5. The rotary drum release assembly as recited in claim 1, wherein said rotary drum shaft includes a substantially rounded distal end.

6. The rotary drum release assembly as recited in claim 5, wherein said rotary drum shaft includes a groove adjacent said rounded distal end, said groove locatable within said sleeve.

7. The rotary drum release assembly as recited in claim 1, wherein said lock pin includes a substantially square portion and a substantially cylindrical portion.

8. The rotary drum release assembly as recited in claim 7, wherein said sleeve includes a square opening to receive said square portion of said lock pin.

9. The rotary drum release assembly as recited in claim 8, wherein said substantially square portion includes an arcuate distal end to engage a shaft groove.

10. In a drain cleaning machine having a rotary drum, a drum release assembly comprising:
    a sleeve to rotatably receive a rotary drum shaft having a shaft groove, said rotary drum shaft defining an axis of rotation;
    a fixed cylindrical member coaxially mounted about said sleeve;
    a lock pin mounted substantially perpendicular to said axis of rotation, said lock pin including a square portion movable through a square opening in said sleeve and engageable with said shaft groove;
    a biasing member to bias said lock pin toward said axis of rotation; and
    a cam surface engageable with said lock pin, said cam surface rotatable about said axis of rotation to drive said lock pin against said biasing member.

11. The rotary drum release assembly as recited in claim 10, further including a lock plate mounting said cam surface, said lock plate having an actuating handle to rotate said lock plate about said axis of rotation relative to said fixed cylindrical member.

12. The rotary drum release assembly as recited in claim 11, wherein said actuating handle maintains said lock plate in a locked position.

13. The rotary drum release assembly as recited in claim 10, wherein said substantially square portion includes an arcuate distal end.

14. A drain cleaning machine comprising:
    a support frame;
    a removable rotary drum;
    a rotary drum shaft extending from said rotary drum, said rotary drum shaft defining an axis of rotation and having a groove adjacent a distal end;
    a drive assembly to rotate said rotary drum about said axis of rotation;
    a sleeve mounted to said support frame to rotatably receive said rotary drum shaft, said sleeve having a square opening;
    a fixed cylindrical member coaxially mounted about said sleeve;
    a lock pin having a square portion movable through said square opening and engageable with said shaft groove;
    a biasing member to bias said lock pin toward said axis of rotation; and
    a lock plate rotatable about said sleeve, said lock plate having a helical cam surface engageable with said lock pin, said helical cam surface rotatable about said axis of rotation relative to said fixed cylindrical member to drive said lock pin against said biasing member.

15. The drain cleaning machine as recited in claim 14, wherein said sleeve is mounted through a first and second cross member of said support frame, said lock pin and said lock plate mounted between said first and second cross member.

16. The drain cleaning machine as recited in claim 15, further including an actuating handle extending from said lock plate between said first and second cross member.

17. The drain cleaning machine as recited in claim 14, wherein said lock plate includes a first and second halve.

18. The drain cleaning machine as recited in claim 14, wherein said sleeve contains a bearing to receive said rotary drum shaft.

* * * * *